June 12, 1962      SANG YUL AN      3,038,707

FUEL REGULATING DEVICE FOR INTERNAL COMBUSTION ENGINE

Filed Nov. 19, 1956

INVENTOR.
SANG YUL AN
BY Thomas J. Tolan
ATTORNEY

United States Patent Office 3,038,707
Patented June 12, 1962

3,038,707
FUEL REGULATING DEVICE FOR INTERNAL COMBUSTION ENGINE
Sang Yul An, Chongno-ku, Seoul Special City, Korea (P.O. Box 1219, The Seoul International Post Office)
Filed Nov. 19, 1956, Ser. No. 623,243
1 Claim. (Cl. 261—58)

This invention relates to the structure of a fuel intercepting valve for use in the injecting chamber of the fuel supply regulator for an internal combustion engine, such as is used in the automobile.

The fundamental object of the invention is to provide for fuel feed to an internal combustion engine so regulated that it is automatically adjusted to the load demand on the engine.

Other objects and advantages of the invention will in part be obvious and in part appear hereinafter.

The invention, accordingly, is embodied in a carburetion device in combination with fuel regulating valves, the valves individually having reentrant grooves with spring loading, the spring loading between the valves being of a differential character so that adjustment between the valves may be in accordance with the vacuum developed in the manifold during acceleration and deceleration.

The combination consisting of the carburetion device, fuel regulating, and fuel intercepting valves, operates so that the fuel regulating valve functions to regulate the fuel supply by restricting the supply passage to the injection nozzle, and the fuel intercepting valve functions to limit injection of liquid fuel through the fuel regulating valve by reinjecting into said supply passage, gaseous fuel and air intercepted at a point downstream of said injection nozzle. The fuel regulating valve also acts to shut off the fuel supply when the fuel intercepting valve is made operative by high manifold vacuum, which is developed during periods of deceleration, through spring adjustment by establishing a differential between the spring loading of the fuel regulating valve and the spring loading of the fuel intercepting valve. The fuel regulating valve is made operative by low vaccum.

The structure of the invention may be more readily understood by reference to the accompanying drawings wherein FIGURE 1 represents a longitudinal section through the body of the device;

Figure 1:
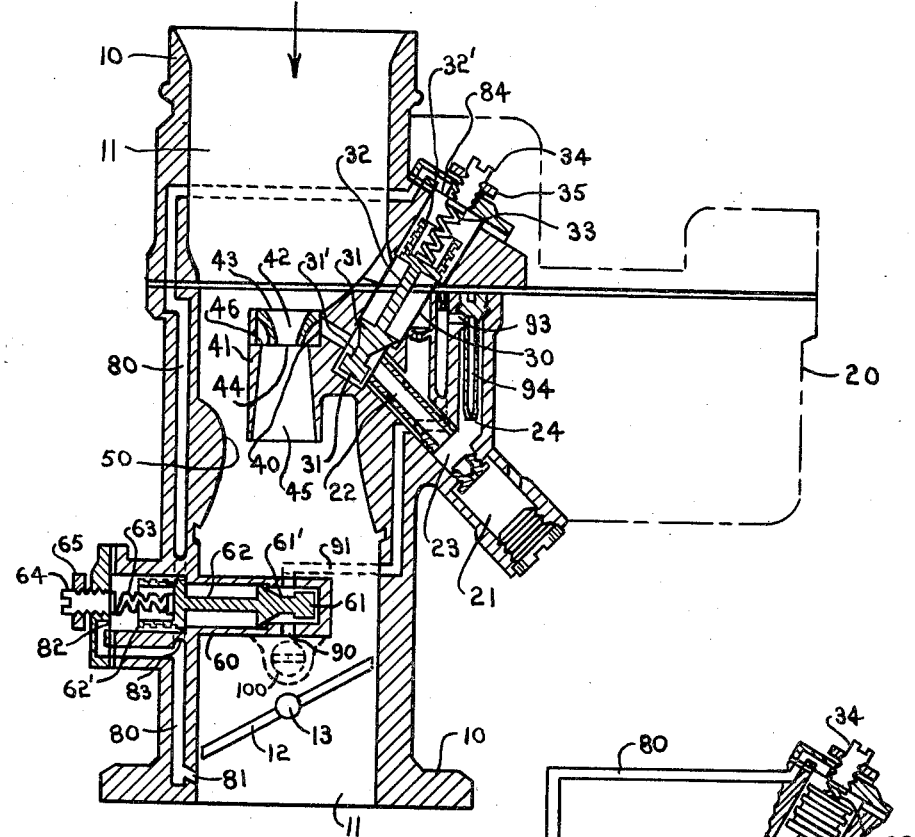
Figure 2:
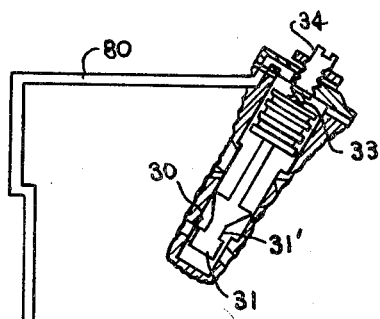
FIGURE 2 is a side view of the valve structure.
Figure 3:
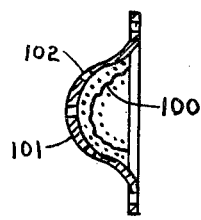
FIGURE 3 is a secondary view enlarged of a portion of the structure.

Referring now to the drawings 10 represents the body of a manifold or carburetor structure in which 11 is the main conduit for air fuel mixtures traveling in the direction indicated by the arrow. Throttle control of flow through the manifold is developed by means of valve 12, which is a gate large enough to close the entire section of the conduit, and is pivoted on axis 13.

The fuel tank 20 feeds fuel to fuel pump 21 which operates to force fuel through the conduit 22 into the manifold 11. The fuel line is encased within conduit 23 which is connected to air conduit 24 so that a fuel-air mixture reaches the manifold.

Intercepting the fuel conduit 22 at the manifold is the cylinder bore 30, in which piston 31 is carried by stem 32, which in turn is loaded by spring 33 and set in place by set screw 34 with closure nut 35. Stem 32 is fitted in place by head 32' which is of conventional ring-packing structure. The piston 31 is characterized by its having a circumferential groove 31' so that in the fully extended position shown the fuel passage into the manifold is fully open and in a retracted position the portion 31 of the cylinder will close the fuel passage 22.

The point of primary injection of the fuel is the line 22 which directs the stream of fuel through the orifice 40, which is formed as part of the venturi feed throat in conduit 41. This conduit is longitudinally aligned in the main line of flow of air and consists of a primary orifice 42 which feeds from a wide mouth 43 through the narrow mouth 44 into the secondary orifice 45 which is characteristically a tapered one which has its narrowed opening 46 arranged to be essentially coplanar with the narrow opening 44 of the primary orifice. By this arrangement of dual orifices, the fuel-air mixture is injected circumferentially around the orifice 44 to be directed through the conduit 45, thereby to obtain the benefit of the injection effect, or acceleration, on air flowing through the orifice 43.

Efficient commingling of fuel and air thus occurs in the chamber. It is to be noted that a tertiary injection effect is obtained by discharge of the fuel-air mixture from the wide mouth of orifice 45 because it is essentially centrally located in the constricted portion 50 of the main conduit or manifold itself.

The structure of the fuel intercepting valve is similar to that of the fuel injecting valve. It consists of the well 60 in the wall of the manifold 10 and has the plunger 61 carried by stem 62 therein, which stem 62 is loaded for reciprocal movement by spring 63 which in turn is held in place by set screw 64 and nut 65. Plunger or piston 61 has the groove 61' circumferentially formed therein to form a circumferential orifice in the cylinder head 61. Stem 62 is fitted in place by head 62' which is of conventional ring-packing structure. Conduit 80, formed in the wall of the main conduit 11, connects the manifold from a point 81 below the throttle 12 to the head 82 in the cylinder. It also continues along the side of the manifold at a level corresponding to 83 to the head of the cylinder 30 at a point 84. Level 83 is fixed so that the conduit is closed by head 62' in the fully extended position shown. Further connection from the fuel intercepting valve is through the orifice 90 and conduit 91 to 93 where gaseous fuel and air intercepted is reinjected by nozzle 94 into supply passage 23.

In essence it is to be noted that this form of fuel feed back with automatic control is such that when the liquid demand is reduced by deceleration, the vacuum prevailing in the conduit 11 operates the intercepting and injecting valves so that the rate of liquid fuel injection is reduced by the injection of gaseous fuel and air.

On the fuel intercepting valve over orifice 90 there is mounted the filter cap 100 carrying the perforated cover plate 101 to permit easy flow of air through the orifices 102 etc. Filter cap 100 may be formed of any porous filter material, such as glass wool, asbestos, or the like.

In operation the device functions as follows:

When the fuel regulating valve and fuel intercepting valves are in their starting conditions the circumferential grooves 31' and 61' are aligned with the through orifices 22 and 90 in the respective valve cylinders and the fuel regulating valve does not hinder injection of fuel into the manifold nor does the intercepting valve hinder withdrawal of gaseous fuel. It is vacuum conditions developing in the manifold which bring this regulatory device into operation. The degree to which these circumferential grooves are brought into play will depend upon loading of the springs and the balance of the vacuum applied to each valve.

During any period when the automobile is running by its own inertia, for example on a level surface or down a decline, valve 30 adequately regulates the feed supply and actually can cut it off completely. This condition would prevail during a run down hill when the vacuum condition in the manifold created by closing throttle 12, would draw plunger 31 upward to a position such as to cut off passage 22. Piston 61 would also be withdrawn to cut off orifice 90. In this condition, thus, both valves would be withdrawn to close off the respective orifices.

A very powerful pull on the fuel line 23 is presented when plunger 31 is about half withdrawn to intercept the passage 22.

The pull is strong enough to cause gaseous fuel to be drawn through partially retracted interceptor valve, and to be fed back to conduit 23. The intercepted gaseous fuel is a mixture of vapor and air, and its return to the liquid fuel feed line in bubble form decreases the density of fuel being admitted past the feed valve and thereby reduces the flow of liquid fuel.

Though the invention has been described with reference to only a single embodiment, it is to be understood that variations thereof may be devised without departing from its spirit or scope.

What is claimed is:

In a fuel feed manifold including a throttle valve for the feeding of fuel to an internal combustion engine the combination of a first conduit, nozzle means for injecting fuel into said first conduit, a fuel supply passage for supplying liquid fuel to said nozzle, first valve means having a regulatory cylinder in said fuel supply passage, a second conduit embodying a second valve means for intercepting gaseous fuel at a point in said first conduit downstream from said nozzle means and conducting same into said supply passage upstream of said nozzle, a pressure responsive operator for each of said valves, a third conduit means interconnecting operators of said first and second valves with a source of vacuum in said manifold downstream of said throttle valve, whereby vacuum developed downstream from said throttle valve is applied to both said valve operators, thereby to adjust the liquid fuel supply to said nozzle in accordance with manifold pressure, and to further vary the density of the fuel in said supply passage by the introduction of gaseous fuel thereinto under the control of said second valve means.

References Cited in the file of this patent

UNITED STATES PATENTS 2,611,594    Anderson _____ Sept. 23, 1952